(12) United States Patent
Cohen et al.

(10) Patent No.: US 10,825,109 B2
(45) Date of Patent: Nov. 3, 2020

(54) PREDICTING ENTITY OUTCOMES USING TAXONOMY CLASSIFICATIONS OF TRANSACTIONS

(71) Applicant: Laso, Inc., New York, NY (US)

(72) Inventors: Adam Cohen, New York, NY (US); Jay McLain, New York, NY (US); Jim Chonko, New York, NY (US); Eric Hexter, New York, NY (US)

(73) Assignee: Laso, Inc., New York, NY (US)

( * ) Notice: Subject to any disclaimer, the term of this patent is extended or adjusted under 35 U.S.C. 154(b) by 0 days.

(21) Appl. No.: 16/721,817

(22) Filed: Dec. 19, 2019

(65) Prior Publication Data

US 2020/0151825 A1 May 14, 2020

Related U.S. Application Data

(63) Continuation of application No. 16/683,245, filed on Nov. 13, 2019.

(60) Provisional application No. 62/760,298, filed on Nov. 13, 2018.

(51) Int. Cl.
*G06Q 10/00* (2012.01)
*G06Q 40/00* (2012.01)
*G06F 16/21* (2019.01)
*G06N 5/04* (2006.01)

(52) U.S. Cl.
CPC ........... *G06Q 40/12* (2013.12); *G06F 16/212* (2019.01); *G06N 5/04* (2013.01)

(58) Field of Classification Search
CPC .............................. G06Q 40/12; G06F 16/212

USPC .......................................................... 705/30
See application file for complete search history.

(56) References Cited

U.S. PATENT DOCUMENTS

| | | | |
|---|---|---|---|
| 6,446,061 B1 * | 9/2002 | Doerre ................. | G06F 16/355 707/738 |
| 7,797,203 B2 * | 9/2010 | Zmolek ................. | G06Q 10/10 705/26.1 |
| 8,805,737 B1 | 8/2014 | Chen | |
| 2003/0236677 A1 * | 12/2003 | Casati ............... | G06O 10/0639 705/7.27 |

(Continued)

OTHER PUBLICATIONS

International Search Report and Written Opinion for international application PCT/US2019/061337 dated Feb. 12, 2020.

*Primary Examiner* — Rokib Masud
(74) *Attorney, Agent, or Firm* — Fish & Richardson P.C.

(57) ABSTRACT

Methods, systems, and computer programs, for predicting a likely outcome for an entity. A method includes obtaining a first data structure that includes data that represents a transaction, determining a similarity level of the transaction to each of a plurality of categories, determining a transaction category based on the determined similarity level, generating an input data structure that includes data representing (i) at least a portion of the data representing the transaction, and (ii) data describing the determined category, providing the input data structure to a predictive algorithm trained to determine a value that represents a likely outcome for an entity that initiated a transaction, obtaining output generated by the predictive algorithm based on the predictive algorithm's processing of the input data structure, the output including a value that represents a likely outcome for the entity, and determining a likely outcome for the entity based on the obtained output.

12 Claims, 3 Drawing Sheets

(56) References Cited

U.S. PATENT DOCUMENTS

| | | | |
|---|---|---|---|
| 2004/0015378 A1* | 1/2004 | Casati | G06Q 10/063 705/7.38 |
| 2004/0193506 A1* | 9/2004 | Zmolek | G06O 30/0621 705/26.1 |
| 2016/0210631 A1 | 7/2016 | Ramasubramanian et al. | |

* cited by examiner

PREDICTING ENTITY OUTCOMES USING TAXONOMY CLASSIFICATIONS OF TRANSACTIONS

CROSS-REFERENCE TO RELATED APPLICATIONS

This application is a continuation of U.S. patent application Ser. No. 16/683,245, filed on Nov. 13, 2019 and entitled, "PREDICTING ENTITY OUTCOMES USING TAXONOMY CLASSIFICATIONS OF TRANSACTIONS," which claims the benefit of U.S. Provisional Patent Application No. 62/760,298, filed Nov. 13, 2018 and entitled, "A Data Source Selection Model For Selectively Generating An Input Data Structure For Input To A Machine Learning Model Based on Analysis Of Data Obtained From Multiple Different Data Source Inputs," both of which are incorporated herein by reference in their entirety.

TECHNICAL FIELD

The subject matter of the present disclosure is directed towards the classification of transaction data to derive attributes about an entity to predict entity outcomes.

BACKGROUND

Transactional data describing a transaction, of which an entity is a party to, can be generated and stored in one or more databases. Such transactional data has historically been used for record keeping purposes.

SUMMARY

According to one innovative aspect of the present disclosure, a method for predicting a likely outcome for an entity is disclosed. The method can include actions of obtaining, by the one or more processors, one or more first data structures that each include fields structuring data that represents a transaction, and for each particular first data structure of the one or more first data structures: determining, by the one or more processors, a level of similarity of the transaction represented by the particular first data structure to each of a plurality of predetermined categories, determining, by the one or more processors, a category of the transaction represented by the particular first data structure based on the determined level of similarity, generating, by the one or more processors, an input data structure that includes fields structuring data representing (i) at least a portion of the data representing the transaction that is structured by the first data structure, (ii) data describing the determined category, providing, by the one or more processors, the input data structure to a predictive algorithm that has been trained to determine a value that represents a likely outcome for an entity that initiated a transaction, obtaining, by the one or more processors, output data generated by the predictive algorithm based on the predictive algorithm's processing of the input data structure, wherein the output data includes a value that represents a likely outcome for the entity that initiated the transaction represented by the particular first data structure, and determining, by the one or more processors, a likely outcome for the entity based on the obtained output data.

Other versions include corresponding systems, apparatus, and computer programs to perform the actions of the methods defined by instructions encoded on computer readable storage devices.

These and other versions may optionally include one or more of the following features. For instance, in some implementations, the method can further comprise: for each particular first data structure of the one or more first data structures: determining, by the one or more processors, that a relationship exists between the data representing the transaction that is structured by the particular first data structure and data representing one or more other transactions and generating, by the one or more processors, one or more second data structures representing (i) at least a portion of the data representing the financial transaction that is structured by the particular first data structure and (ii) data describing the determined relationship of the financial transaction that is structured by the particular first data structure to one or more other transactions represented by first data structures. In such implementations, determining, by the one or more processors, a level of similarity of the transaction represented by the particular first data structure to each of a plurality of predetermined categories can include determining, by the one or more processors, a level of similarity of the transaction represented by the particular second data structure to each of a plurality of predetermined categories. Similarly, in such implementations, determining, by the one or more processors, a category of the transaction represented by the particular first data structure based on the determined level of similarities can include determining, by the one or more processors, a category of the transaction represented by the particular second data structure based on the determined level of similarities. Similarly, in such implementations, generating, by the one or more processors, an input data structure that includes fields structuring data representing (i) at least a portion of the data representing the transaction that is structured by the particular first data structure and (ii) data describing the determined category can include generating, by the one or more processors, an input data structure that includes fields structuring data representing (i) at least a portion of the data representing the transaction that is structured by the second data structure, (ii) data describing the determined category.

In some implementations, the generated input data structure can also include one or more fields structuring data that represents non-financial information.

In some implementations, the value that represents a likely outcome for the entity includes a probability of default by the entity.

In some implementations, the value that represents a likely outcome for the entity includes a probability that the entity will become delinquent on a future financial obligation.

In some implementations, the value that represents a likely outcome for the entity includes a probability that and entity that becomes delinquent will subsequently be able to satisfy the obligation.

In some implementations, the value that represents a likely outcome for the entity includes a probability that the entity has initiated a fraudulent transaction.

In some implementations, the value that represents a likely outcome for the entity includes a probability that the entity will purchase a product or service.

In some implementations, the value that represents a likely outcome for the entity includes a probability that the entity will achieve a financial goal or objective.

In some implementations, the value that represents a likely outcome for the entity includes a probability that the entity will achieve a financial goal or objective given one or more hypothetical financial transactions.

In some implementations, obtaining, by the one or more processors, one or more first data structures that include fields structuring data that represents a transaction can include accessing, by the one or more processors, a database of a financial institution that stores multiple first data structures that each include fields structuring data that represents a particular financial transaction that was previously initiated by the entity.

In some implementations, obtaining, by the one or more processors, one or more first data structures that include fields structuring data that represents a transaction can include accessing, by the one or more processors, data representing a real-time transaction before the real-time transaction is authorized, the data representing the real-time transaction comprising at least one first data structure that includes fields structuring data that represents the real-time transaction.

In some implementations, the transaction can include a financial transaction.

In some implementations, the category of the transaction is a transaction classification of a taxonomy classifier.

These and other aspects of the present disclosure are discussed in more detail in the detailed description below with reference to the accompanying drawings

DETAILED DESCRIPTION

The present disclosure is directed towards methods, systems, and computer programs, for predicting an entity outcome using a taxonomy of classifications of transaction data. In one implementation, the present disclosure can be configured to obtain transaction data such as financial transaction data and classify the transactional data using a taxonomy of transaction classifications. The present disclosure can generate an input data structure that includes at least a portion of the transaction data and the taxonomy classification. The input data structure can be provided as an input to a predictive algorithm to predict entity outcomes based on processing of data structures containing attributes that are derived from categorically related transaction data. Output data generated by the predictive algorithm can be analyzed by an outcomes evaluation engine. The outcomes evaluation engine can identify a particular outcome of multiple particular outcomes based on the output data generated by the predictive algorithm. Based on an identified outcome, an action engine can perform one or more real world actions based on the identified outcome.

By way of example, the transaction data can include financial transactions such as bank transaction records, point-of-sale transactions, or the like. In such an implementation, the present disclosure can an entity's bank transaction records as being logically related to a particular taxonomy classification such as payroll, superstores, entertainment, utilities, car payment, loan payment, child support, or the like. The present disclosure can generate an input data structure, based on the bank transaction record, that includes fields structuring data that logically relates the bank transaction to particular taxonomy classification. The input data structure can be input to a predictive algorithm to estimate the likelihood of one or more entity outcomes such as a probability of default for a financial transaction—transaction taxonomy classification pair. The predictive algorithm can generate output data indicative of a particular outcome based on the predictive algorithm's processing of the input data structure that logically relates bank transaction data with a particular taxonomy classification. An outcomes evaluation engine can evaluate the generated output data to determine particular outcome such as a probability of default of an entity that was a party to the bank transaction of the input data structures. Then, the action engine can use the probability of default to execute one or more actions such as approving or denying a loan, approving or declining a point-of-sale transaction, setting a credit line and credit limit, or the like.

In the context of bank transaction records, a plurality of records may be processed through the system described by the present disclosure. Accordingly, in some implementations, the outcomes evaluation engine, action engine, or both, can each determine an outcome, action, or both based on a single bank transaction record. However, in other implementations, the outcomes evaluation engine, action engine, or both, can determine an outcome, an action, or both, based a plurality of bank transaction records. For example, the system of the present disclosure can be used to generate output data, by the predictive algorithm, for each of the plurality of bank transaction records. Then, the output data generated by the predictive algorithm can be aggregated by, for example, the outcomes evaluation engine to an outcome based on the collective analysis, by the system, of the plurality of bank transaction records. In some implementations, for example an average probably of default, median probability of default, or the like can be generated from system's processing of a plurality of financial transactions such as bank transaction records.

In manner similar to the analysis, by the system, of bank transaction records, a single electronic point-of-sale transaction record can be evaluated to predict a likelihood of fraud. In such implementations, a financial transaction record that is submitted with request for point-of-sale authorization can be processed by the system in the same manner described with respect to the bank transaction records above. In such implementations, the predictive algorithm can be programmed to determine the likelihood that a point-of-sale transaction record is potentially fraudulent through association with a one or more bank transaction record's taxonomy classifications.

In some implementations, a similarity engine that is used to classify a transaction data has being logically related to a particular taxonomy classification may consider more than just the transaction data. For example, the similarity engine can, in some implementations, receive input from a pre-processing engine that provides additional data indicating that the transaction data is related, or not related, to one or more prior transactions. If provided with additional data describing that (i) transaction data is related to one or more prior transactions is identified or (i) a lack of any relationship, at all, to any prior transactions is discovered, the similarity engine can make better informed classifications.

Techniques of the present disclosure can be useful in preventing financial loss to a financial institution that is extended loans or credit to individuals, businesses, or other entity that conventional systems cannot detect. For example, conventional systems may extend credit based on income, cash on hand, a credit score, or any combination thereof, but are not able to spot a decline in an individual's personal finances such as when an individual becomes unemployed. However, present disclosure can identify credit risks, and even outright fraudulent transactions, by analyzing transaction data using the techniques described herein.

Figure 1:
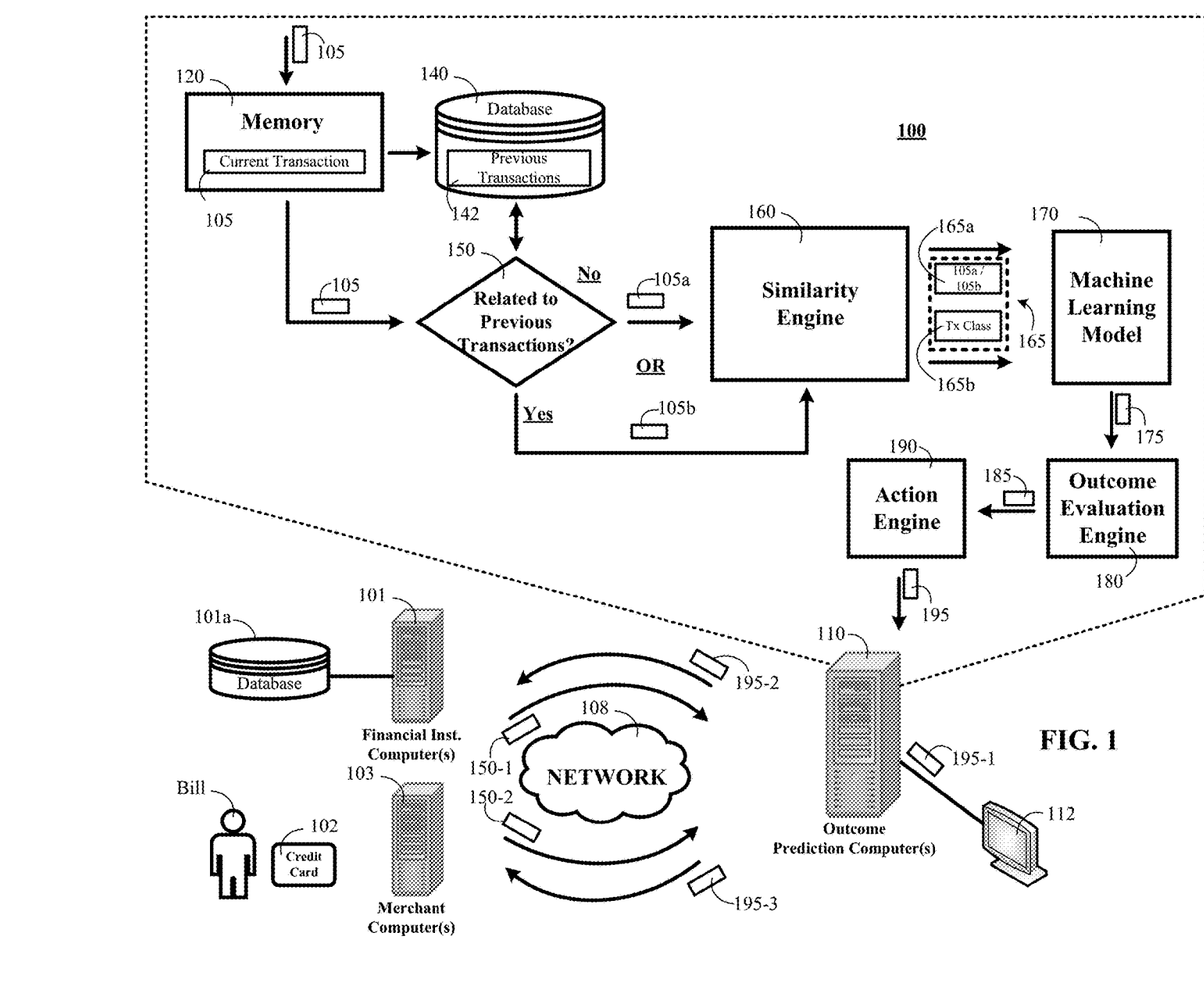
FIG. 1 is a contextual diagram of an example of a system for predicting entity outcomes using taxonomy classifications of transaction data.

FIG. 1 is a contextual diagram of an example of a system 100 for predicting entity outcomes using taxonomy classifications of transaction data. In one aspect, the system 100 can include an outcome prediction computer 110. The outcome predictions computer 110 can include one, or multiple, computers that host the components of the outcome prediction computer 110 shown in FIG. 1. These components can include a memory unit 120, a database 140, a pre-processing engine 150, a similarity engine 160, a predictive algorithm 170, an outcome evaluation engine 180, and an action engine 190. For purposes of this specification, a "engine" is broadly used to refer to a software based system or subsystem that can perform one or more specific functions. Generally, an engine will be implemented as one or more software modules or components, and installed on one or more computers in one or more locations. In some cases, one or more computers will be dedicated to a particular engine; in other cases, multiple engines can be installed and running on the same computer, or computers. The system 100 can also include one or more computers from a financial institution 101, one or more merchant computers 103, a network 108, or any combination thereof.

The outcome prediction computer 110 can obtain one or transaction records 105 from one or more data sources such as the financial institution computer 101 or the merchant computer 103. By way of example, the transaction record 105 can include financial transactions such as bank transaction records 105-1 from a financial institution database 101a hosted by a financial institution computer 101. By way of another example, the transaction record 105 can include a point-of-sale authorization request 105-2 received from a merchant computer 103. In some implementations, the outcome prediction computer 110 can be authorized to access and obtain the transaction data from one or more database 101a over a network 108. In other implementations, the outcome prediction computer 110 can be authorized to receive, across the network 108, transaction data as a point-of-sale authorization request occurs. The network 108 can include a wired or wireless LAN, a wired or wireless WAN, an Ethernet network, a Wi-Fi network, a cellular network, the Internet, payment processing networks, distributed ledgers or any combination thereof.

An obtained, or otherwise received, transaction record 105 can be stored in a memory unit 120 as a current transaction. Storing the transaction record 105 in memory unit such as solid state memory device can improve the speed and throughput of the system 100 by avoiding the steps necessary to store and retrieve the current transaction from a database storage. In other implementations, the current transaction data may be stored in a database such as a relational database, distributed ledger, file system or data container on a different type of memory device such as magnetic disk storage and accessed as needed by the system 100 to perform further operations.

The computer 110 can begin analysis of the current transaction by performing pre-processing of the current transaction 105 using the pre-processing module 150. The pre-processing engine 150 is configured to determine whether the current transaction 105 is related to one or more previous transaction 142. If the current transaction is determined to not be related to one or more previous transactions, then the pre-processing engine 150 can provide a data structure 105a as an input to the similarity engine 160 that includes at least a portion of the data received in the transaction record 105. Alternatively, if the current transaction is determined to be related to one or more previous transaction 142, then the pre-processing engine 150 can generate a second data structure 105b that includes (i at least a portion of the data received in the transaction record 105a and (ii) data that describes the relationship between the current transaction and the previous transactions. For example, the pre-processing engine 150 can determine whether the current transaction is for the same amount as one or more previous transaction, whether the current transaction paid the same merchant as the previous transaction, or the like.

In some implementations, if the current transaction is determined to be related to a previous transaction, it can provide a useful signal to the similarity engine regarding classification of the current transaction. For example, if the current transaction is determined to be similar to a previous transaction, then the current transaction may have the same taxonomy classification as the related previous transaction. In other implementations, if the current transaction is determined to not be related to a previous transaction, it can similarly provide a useful signal to the similarity engine regarding classification of the current transaction. For example, if the current transaction is determined to not be similar to a previous transaction, then the current transaction may be determined to not be of the same taxonomy classification as any of the previous transactions. Such additional information indicating that the current transaction is not related to any of the previous transactions can function to filter out taxonomy classifications from similarity evaluation by the similarity engine 160, reduce latency, increase throughput, and reduce execution time for processing of the current transaction by the system 100 because less than all taxonomy classifications of the taxonomy need to be evaluated.

In some implementations, the pre-processing engine 105 can determine that the current transaction 105 is related to the previous transactions if the current transaction occurred within a predetermined period of time one or more of the previous transactions 142. In some implementations, data indicating whether the current transaction 105 is related to one or more previous transactions in a time series can be indicative of potential fraud or risk. Accordingly, time series data, indicating whether or not the current transaction is time-series related can be a feature of data structure 105b for input to the similarity engine 160.

The pre-processing engine 105 can generate one or more data structures for input to the similarity engine 160. The one or more data structures can include a data structure 105a or a data structure 105b. The pre-processing engine can generate a data structure 105a if it is determined that the current transaction 105 is not related to one or more of the previous transaction stored in the database 140. The data structure 105 includes at least a portion of the transaction data included in the current transaction 105. Alternatively, the pre-processing engine can generate a data structure 105b if it is determined that the current transaction 105 is related to one or more previous transactions stored in the database 140. In some implementations, the current transaction can be determined to be related to one or more previous transactions if the current transaction was executed within a same time-series the one or more previous transactions 142.

Transactions can be executed within the same time-series if they are executed in successive times that are within a predetermined time of each other. In some implementations, the predetermined time is a time period that can be dynamically configured by a designer of the system 100 and can range from a few hundred pico-seconds of each other to within a few weeks of each, or more.

The similarity engine 160 can receive the data structure 105a or the data structure 105b. The similarity engine 160 is configured to determine a similarity of the transaction represented by either data structure 105a or 105b to a classification of a taxonomy. The taxonomy classifier can include a plurality of transaction classifications that are each associated with a classification vector. Examples of transaction classifications that can be associated with a corresponding transaction classification vector include, for example, entertainment, auto, fuel, childcare, student loans, personal loan, travel, utilities, dining, child support, medical expenses, or the like. The similarity engine 160 can generate transaction vector that is based on the received data structure 105a or 105b. The similarity engine 160 can compare the generated transaction vector to each of the transaction classification vectors of the taxonomy classifier. In some implementation, the similarity engine can compare the generated transaction vector, which is based on the data structure 105a or 105b, to each of the transaction classification vectors by calculating a distance between the generated transaction vector and each transaction classification vector, or a probability representing the highest likelihood transaction classification for the generated transaction vector.

By way of a first example, the distance between the generated transaction vector and each transaction classification vector can be determined by using one or more neural networks, decision tree, a bespoke algorithm, a bespoke method, or any combination. By way of another example, the distance between the generated transaction vector and each transaction classification vector can be determined by calculating the mathematical similarity between the vectors. The closer the distance between the generated transaction vector and a particular transaction classification, the more similar the generated transaction vector is to the particular transaction classification. The similarity engine 160 can select the taxonomy classification for the current transaction 105 represented by transaction vector that is the shortest distance away from the transaction vector in a vector space.

The similarity engine 160 can generate output data that includes a data structure 165. The data structure 165 can include one or more fields structuring data 165a that represents the current transaction 105. The data 165 can be data extracted from the current transaction 105. Alternatively, the data 165a can include the transaction vector that represents the current transaction 105. The data structure 165 can also include one or more fields structuring data that represents the taxonomy classification identified, by the similarity engine 160, as being similar to the transaction vector. Though the output data is described as being a single data structure 165, the present disclosure is not so limited. Instead, there may be implementations where the similarity engine 160 outputs separate data structures for 165a and 165b.

The data structure 165 having (i) fields representing information 165a that includes information that represents at least a portion of the transaction information of the current transaction 105 and (ii) fields structuring information that represents a taxonomy classification can be provided as an input to a predictive algorithm 170. The predictive algorithm 170 can be trained to predict a particular entity outcome based on the predictive algorithm's 170 processing of the input data structure 165. In some implementations, the system 100 can include only a single predictive model 170 is used to predict output data 175 that is indicative of a likelihood of a particular entity outcome such as probability of default, probability that an entity is likely to become delinquent on a future obligation, a probability that an entity that becomes delinquent will subsequently be able to satisfy the delinquent obligation, a probability that an entity will purchase a product or service, a probability that an entity will achieve a financial goal or objective, probability that a point-of-sale debit or credit authorization request is fraudulent, or the like.

Alternatively, the system 100 can include a plurality of predictive models 170 can be configured in parallel with each other. In such implementations, the system 100 can provide the data structure 165 to each of the parallel predictive algorithm, with each predictive algorithm of the parallel predictive algorithm being trained to predict the likelihood of a particular entity outcome based on the processing of the data structure 165. Accordingly, instead of separate iterations of processing a current transaction through the system 100, single iteration for a current transaction could be performed using the parallel predictive algorithms 170. Such implementation of parallel predictive algorithms 170 can greatly reduce latency, increase throughput, and lead to faster determinations of entity outcomes The trained predictive algorithm 170 can include one or more types of machine learning models or other algorithms that can be trained to predict entity outcomes based on processing of a data structure 165 that includes at least a portion of current transaction information 165a and a transaction taxonomy classification 165b. By way of example, the predictive algorithm can include one or more neural networks, one or more deep neural networks, one or more linear regression algorithms, one or more random forest algorithms, one or more expert systems, the like, or any selection or combination thereof.

In some implementations, as shown, the predictive algorithm 170 can be hosted by the outcome prediction computer 110. However, in other implementations, the predictive algorithm 170 can be hosted by one or more third party computers that are networked together with the outcome prediction computer 110 using one or more networks such as the network 108. Moreover, while aspects of the present disclosure are described as using a predictive algorithm that can be trained as described herein, the present disclosure is not so limited. Instead, a predictive algorithm can be employed that is programmed using static logic that comprises static program instruction sets to generate outcome data 175. The static program instruction sets can define logical mappings between particular entity outcomes such as probability of default with certain classified transactions or series of transactions.

The output data 175 generated by the trained predictive algorithm 170 can include data that is indicative of a likelihood of a particular outcome occurring based on the predictive algorithm's 170 processing of the input data structure 165. The particular entity outcome is based on the outcome the predictive algorithm was trained to predict. In some implementations, the predictive algorithm can be trained in a supervised manner by providing training input data including (i) at least a portion of transaction information and a (ii) transaction taxonomy classification as an input to the predictive algorithm, determining a different between the output data generated by the predictive algorithm 170 and a label such as a particular entity outcome for the training input data. In some implementations, the output data 175 can include a probability that a particular entity outcome is likely to occur.

The output data 175 can be provided as an input to an outcome evaluation engine 180. The outcome evaluation engine 180 is configured to analyze and interpret the output data 175 generated by the trained predictive algorithm 170 based on the trained predictive algorithm's processing of the data structure 165. In some implementations, the outcome evaluation engine 180 can be configured to apply one or more business rules to the output data 175 generated by the trained predictive algorithm. In some implementations, this can include applying one or more thresholds to the output data 175 generated by the predictive algorithm 170. For example, the outcome evaluation engine 170 can be configured to recommend extending a loan or credit card offer to all entities having a probability of default lower than 20%. The outcome evaluation engine 180 can be configured to apply any number of business rules to output data 175 generated by the predictive algorithm 170 related to the authorization of electronic point-of-sale transactions, extension of loans, determination of a credit limit, determination of loan payment schedules, determinations of modified loan terms, determinations that a transaction is fraudulent, or the like.

The outcome evaluation engine 180 can generate output data 185 that describes the determined outcome. The outcome evaluation engine 180 provide the generated output data 185 to an action engine 190. The action engine 180 is configured to generate triggering data 195 that triggers performance of a particular outcome specified by the output data 185. For example, the outcome evaluation engine 180 can generate triggering data 195-2 that causes display of an alert on the monitor of a financial institution's computer 101 indicating a user that was party to transaction 105-1 is suitable to obtain a loan, due to low probability of default. By way of another example, the outcome evaluation engine 180 can generate triggering data 195-1 that can cause a monitor 112 to alert a user that a user who was a party to the transaction, a loan should not be extended to a customer, due to high probability of default or a high probability of being fraudulent. By way of yet another example, the outcome evaluation engine 180 can generate triggering data 195-3 that can interrupt the credit card (or debit card) transaction authorization due to a determination, by the system 101, that the user Bill who was a party to the point-of-sale authorization request 105-2 that had a high probability of being fraudulent or a high probability of default.

Figure 2:
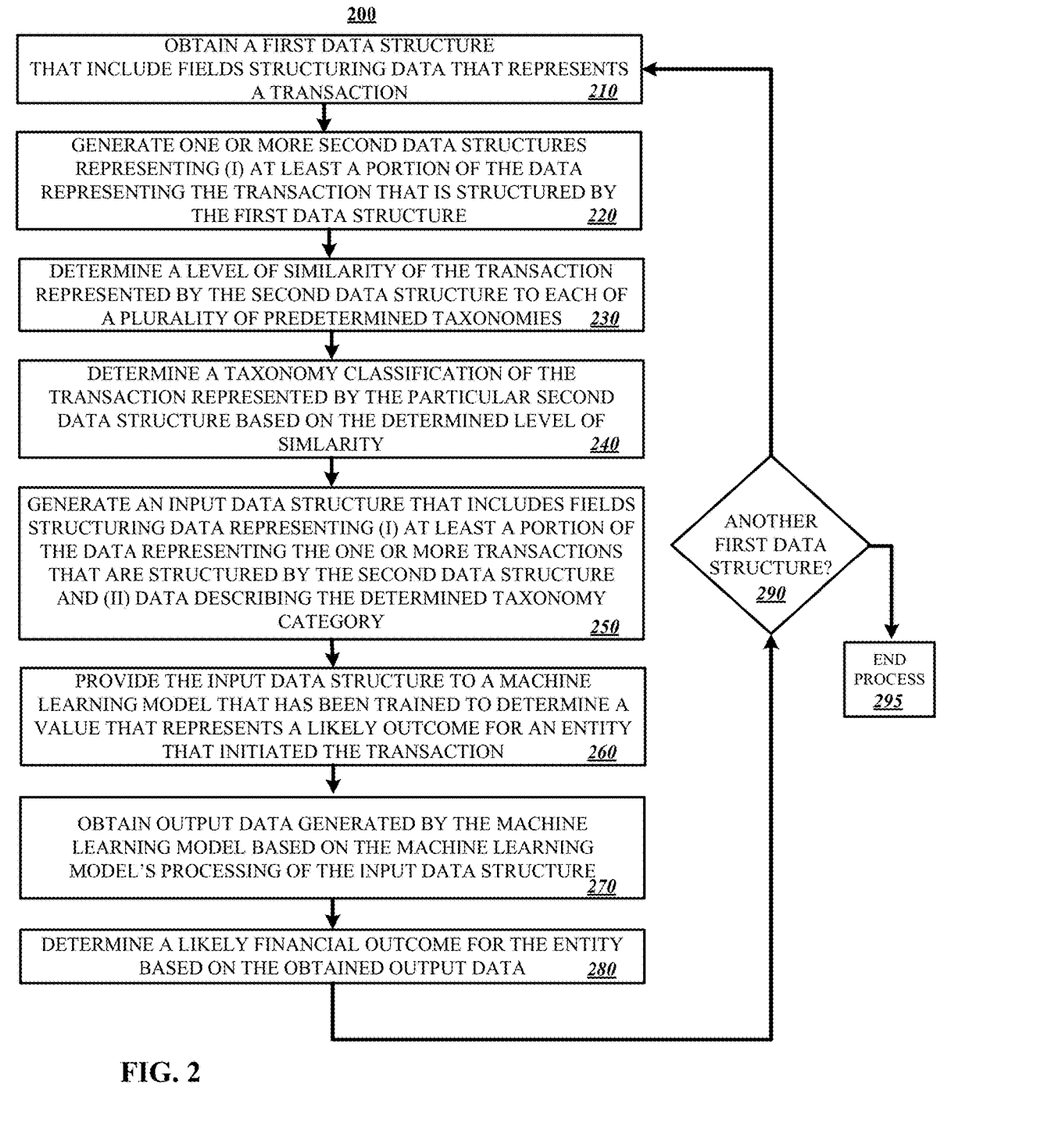
FIG. 2 is a flowchart of an example of a process for predicting entity outcomes using taxonomy classifications of transaction data.

FIG. 2 is a flowchart of an example of a process 200 for predicting entity outcomes using taxonomy classifications of transaction data. The process 200 is described below as being executed by a computer such as the outcome prediction computer 110 of FIG. 1.

A computer can begin performance of the process 200 by obtaining a first data structure that includes fields structuring data that represents a transaction (210). In some implementations, the transaction can include a financial transaction such as a bank deposit, debit or credit transaction, or the like. In some implementations, data representing the transaction can be obtained from a financial institutions database. In other implementations, data representing the transaction can be obtained from one or more merchant computers 103.

The computer can continue performance of the process 200 by determining a level of similarity of the transaction represented by the first data structure to each of a plurality of predetermined categories such as transaction classifications of a taxonomy classifier (220). In some implementations, the level of similarity can be determined by calculating a distance between a vector that represents the transaction and a vector that represents each category or transaction classification of a taxonomy classifier. The computer can determine a category, such as a transaction classification of the taxonomy classifier, of the transaction represented by the first data structure based on the determined level of similarity (230). For example, the computer can select the category or transaction classification that has a corresponding transaction classification vector, which represents the category or transaction classification, that is closest in distance to a vector that represents the transaction.

The computer can continue performance of the process 200 by generating an input data structure that includes fields structuring data representing (I) at least a portion of the data representing the transaction that is structured by the first data structure and (II) data describing the determined category (240). In some implementations, this can include generating a data structure that includes a transaction vector representing the transaction and a transaction classification vector that represents the category or transaction classification where the transaction was categorized or classified based on the similarity determination stage. In some implementations, the generated input data structure can also include one or more fields structuring data that represents non-financial information. The non-financial information can include publicly available data that is accessible, by the computer, from one or more data sources. The non-financial information can include location data, credit data, social media data, public records, or the like. Accordingly, the computer can be configured to interface with a user device providing location data, if permission granted to access location data by the user device, credit bureaus, data sharing services, social media sites, public records databases, or a combination thereof, to obtain non-financial information that can be included into the generated data structure, and in some instances, vectorized for analysis by the predictive algorithm.

The computer can continue performance of process 200 by providing the input data structure generated at stage 240 as an input to a predictive algorithm that has been trained to determine a value that represents a likely outcome for an entity that initiated a transaction (250). The trained predictive algorithm can process the input data structure and generate output data based on the trained predictive algorithms's processing of the input data structure. The computer can obtain output data generated by the predictive algorithm based on the predictive algorithm's processing of the input data structure. In one example implementation, the output data generated by the predictive algorithm can include a probability that the entity will default on an obligation such as a debt obligation. The predictive algorithm can include one or more neural networks, one or more deep neural networks, one or more linear regression algorithms, one or more random forest algorithms, one or more expert systems, the like, or any selection or combination thereof.

The computer can continue performance of the process 200 by determining a likely outcome for the entity based on the obtained output data (270). Determining a likely outcome for the entity based on the obtained output data can include, for example, applying one or more business rules to the obtained output data. Based on the applied business rules, the computer can determine which action, of one or more actions, should be triggered by an action engine based on the generated output data. The computer can determine whether another first data structure is available for processing at stage 280. If there is another first data structure available for processing, the computer can continue performance of process 200 at stage 210. Alternatively, if there is no more first data structures available, then the computer can terminate performance of the process 200 at stage 290.

Figure 3:
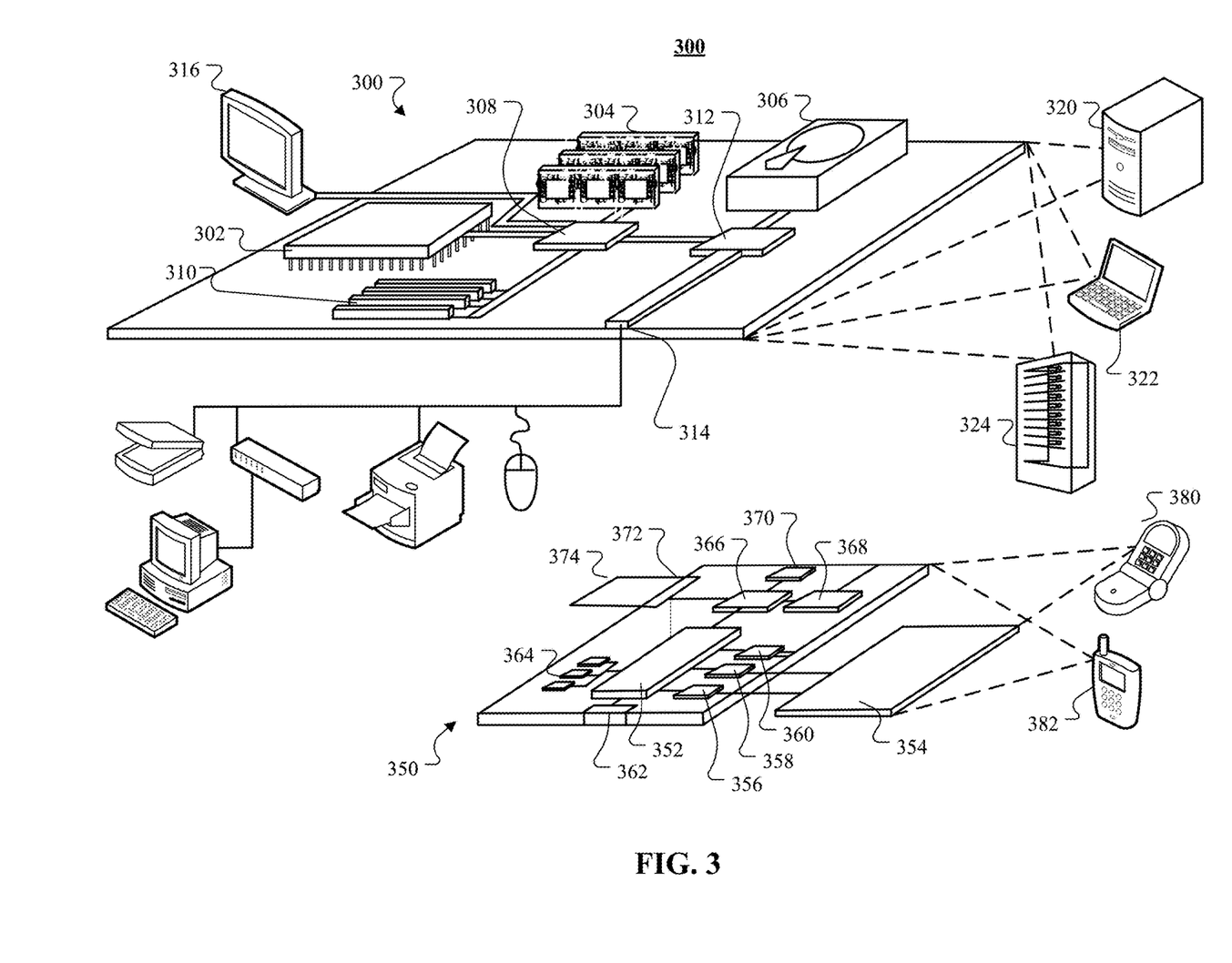
FIG. 3 is a block diagram of an example of system components that can be used to implement a system for predicting entity outcomes using taxonomy classification of transaction data.

FIG. 3 is a block diagram of an example of system components that can be used to implement a system for predicting entity outcomes using taxonomy classification of transaction data.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be examples only, and are not meant to limit implementations of the inventions described and/or claimed in this document.

Computing device 300 includes a processor 302, memory 304, a storage device 308, a high-speed interface 308 connecting to memory 304 and high-speed expansion ports 310, and a low speed interface 312 connecting to low speed bus 314 and storage device 308. Each of the components 302, 304, 308, 308, 310, and 312, are interconnected using various busses, and can be mounted on a common motherboard or in other manners as appropriate. The processor 302 can process instructions for execution within the computing device 300, including instructions stored in the memory 304 or on the storage device 308 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 308 is capable of providing mass storage for the computing device 300. In one implementation, the storage device 308 can be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 308, or memory on processor 302.

The high-speed controller 308 manages bandwidth-intensive operations for the computing device 300, while the low speed controller 312 manages lower bandwidth intensive operations. Such allocation of functions is only an example. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 308 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provided in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can also include secure information. Thus, for example, expansion memory 374 can be provided as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

OTHER EMBODIMENTS

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A system for verifying point-of-sale transactions, the system comprising:
one or more processors; and
one or more computer storage medium storing instructions that, when executed by the one or more processors, causes the one or more processors to perform operations, the operations comprising:
obtaining, by the one or more processors, one or more first data structures that each include fields structuring data that represents a particular point-of-sale transaction initiated by an entity;
storing the one or more obtained first data structures in a solid state memory device; and
for each particular first data structure of the one or more first data structures stored in the solid state memory device:
determining, by the one or more processors, a level of similarity of the transaction represented by the particular first data structure to each of a plurality of predetermined categories;
determining, by the one or more processors, a category of the transaction represented by the particular first data structure based on the determined level of similarity;
generating, by the one or more processors, an input data structure that includes fields structuring data representing (i) at least a portion of the data representing the transaction that is structured by the first data structure and (ii) data describing the determined category;
providing, by the one or more processors, the input data structure to a predictive algorithm that has been trained to determine a value that represents a probability that a point-of-sale transaction initiated by an entity is fraudulent;
obtaining, by the one or more processors, output data generated by the predictive algorithm based on the predictive algorithm's processing of the input data structure, wherein the output data includes a value that represents a probability that the particular point-of-sale transaction initiated by the entity and represented by the particular first data structure is fraudulent; and
determining, by the one or more processors, whether the particular point-of-sale transaction initiated by the entity and represented by the first data structure is fraudulent based on the obtained output data.

2. The system of claim 1, wherein the operations further comprise:
for each particular first data structure of the one or more first data structures:
determining, by the one or more processors, that a relationship exists between the data representing the transaction that is structured by the particular first data structure and data representing one or more other transactions; and
generating, by the one or more processors, one or more second data structures representing (i) at least a portion of the data representing the financial transaction that is structured by the particular first data structure and (ii) data describing the determined relationship of the financial transaction that is structured by the particular first data structure to one or more other transactions represented by first data structures;
wherein determining, by the one or more processors, a level of similarity of the transaction represented by the particular first data structure to each of a plurality of predetermined categories comprises:
determining, by the one or more processors, a level of similarity of the transaction represented by the particular second data structure to each of a plurality of predetermined categories;
wherein determining, by the one or more processors, a category of the transaction represented by the particular first data structure based on the determined level of similarities comprises:
determining, by the one or more processors, a category of the transaction represented by the particular second data structure based on the determined level of similarities;
wherein generating, by the one or more processors, an input data structure that includes fields structuring data representing (i) at least a portion of the data representing the transaction that is structured by the particular first data structure and (ii) data describing the determined category comprises:
generating, by the one or more processors, an input data structure that includes fields structuring data representing (i) at least a portion of the data representing the transaction that is structured by the second data structure and (ii) data describing the determined category.

3. The system of claim 1, wherein the generated input data structure can also include one or more fields structuring data that represents non-financial information.

4. A system for preventing financial loss by a financial institution, the system comprising:
one or more processors; and
one or more computer storage medium storing instructions that, when executed by the one or more processors, causes the one or more processors to perform operations, the operations comprising:
obtaining, by the one or more processors, one or more first data structures that each include fields structuring data that represents a transaction, wherein the transaction includes a request for a particular loan by an entity;
storing the one or more obtained first data structures in a solid state memory device; and
for each particular first data structure of the one or more first data structures stored in the solid state memory device:
determining, by the one or more processors, a level of similarity of the transaction represented by the particular first data structure to each of a plurality of predetermined categories;
determining, by the one or more processors, a category of the transaction represented by the particular first data structure based on the determined level of similarity;
generating, by the one or more processors, an input data structure that includes fields structuring data representing (i) at least a portion of the data representing the transaction that is structured by the first data structure and (ii) data describing the determined category;

providing, by the one or more processors, the input data structure to a predictive algorithm that has been trained to determine a value that represents a probability of default on a loan by an entity;

obtaining, by the one or more processors, output data generated by the predictive algorithm based on the predictive algorithm's processing of the input data structure, wherein the output data includes a value that represents a probability that the entity would default on the particular loan that is requested by the entity and represented by the particular first data structure; and determining, by the one or more processors, whether the entity is likely to default on the particular loan that is requested by the entity and represented by the particular first data structure based on the obtained output data.

5. The system of claim 4, wherein obtaining, by the one or more processors, one or more first data structures that include fields structuring data that represents a transaction comprises:

accessing, by the one or more processors, a database of a financial institution that stores multiple first data structures that each include fields structuring data that represents a particular financial transaction that was previously initiated by the entity.

6. The system of claim 1, wherein obtaining, by the one or more processors, one or more first data structures that include fields structuring data that represents a transaction comprises:

accessing, by the one or more processors, data representing a real-time transaction before the real-time transaction is authorized, the data representing the real-time transaction comprising at least one first data structure that includes fields structuring data that represents the real-time transaction.

7. The system of claim 1, wherein the category of the transaction is a transaction classification of a taxonomy classifier.

8. A method for preventing financial harm, the method comprising:

obtaining, by the one or more processors, one or more first data structures that each include fields structuring data that represents a transaction, wherein the transaction includes (i) a particular point-of-sale transaction initiated by an entity or (ii) a request for a particular loan by an entity;

storing the one or more obtained first data structures in a solid state memory device; and for each particular first data structure of the one or more first data structures stored in the solid state memory device:

determining, by the one or more processors, a level of similarity of the transaction represented by the particular first data structure to each of a plurality of predetermined categories;

determining, by the one or more processors, a category of the transaction represented by the particular first data structure based on the determined level of similarity;

generating, by the one or more processors, an input data structure that includes fields structuring data representing (i) at least a portion of the data representing the transaction that is structured by the first data structure and (ii) data describing the determined category;

providing, by the one or more processors, the input data structure to a predictive algorithm that has been trained to determine (i) a value that represents a probability that a point-of-sale transaction initiated by an entity is fraudulent or (ii) a value that represents a probability of default on a loan by an entity;

obtaining, by the one or more processors, output data generated by the predictive algorithm based on the predictive algorithm's processing of the input data structure, wherein the output data includes (i) a value that represents a probability that the particular point-of-sale transaction initiated by the entity and represented by the particular first data structure is fraudulent or (ii) a value that represents a probability that the entity would default on the particular loan that is requested by the entity and represented by the particular first data structure; and determining, by the one or more processors, (i) whether the particular point-of-sale transaction initiated by the entity and represented by the first data structure is fraudulent based on the obtained output data or (ii) whether the entity is likely to default on the particular loan that is requested by the entity and represented by the particular first data structure based on the obtained output data.

9. The method of claim 8, wherein obtaining, by the one or more processors, one or more first data structures that include fields structuring data that represents a transaction comprises:

accessing, by the one or more processors, a database of a financial institution that stores multiple first data structures that each include fields structuring data that represents a particular financial transaction that was previously initiated by the entity.

10. The method of claim 8, obtaining, by the one or more processors, one or more first data structures that include fields structuring data that represents a transaction comprises:

accessing, by the one or more processors, data representing a real-time transaction before the real-time transaction is authorized, the data representing the real-time transaction comprising at least one first data structure that includes fields structuring data that represents the real-time transaction.

11. The method of claim 1, the method further comprising:

for each particular first data structure of the one or more first data structures:

determining, by the one or more processors, that a relationship exists between the data representing the transaction that is structured by the particular first data structure and data representing one or more other transactions; and generating, by the one or more processors, one or more second data structures representing (i) at least a portion of the data representing the financial transaction that is structured by the particular first data structure and (ii) data describing the determined relationship of the financial transaction that is structured by the particular first data structure to one or more other transactions represented by first data structures;

wherein determining, by the one or more processors, a level of similarity of the transaction represented by the particular first data structure to each of a plurality of predetermined categories comprises:
  determining, by the one or more processors, a level of similarity of the transaction represented by the particular second data structure to each of a plurality of predetermined categories;
wherein determining, by the one or more processors, a category of the transaction represented by the particular first data structure based on the determined level of similarities comprises:
  determining, by the one or more processors, a category of the transaction represented by the particular second data structure based on the determined level of similarities;
wherein generating, by the one or more processors, an input data structure that includes fields structuring data representing (i) at least a portion of the data representing the transaction that is structured by the particular first data structure and (ii) data describing the determined category comprises:
  generating, by the one or more processors, an input data structure that includes fields structuring data representing (i) at least a portion of the data representing the transaction that is structured by the second data structure and (ii) data describing the determined category.

12. A non-transitory computer-readable medium storing software comprising instructions executable by one or more computers which, upon such execution, cause the one or more computers to perform operations comprising:
  obtaining, by the one or more processors, one or more first data structures that each include fields structuring data that represents a transaction, wherein the transaction includes (i) a particular point-of-sale transaction initiated by an entity or (ii) a request for a particular loan by an entity;
  storing the one or more obtained first data structures in a solid state memory device; and
  for each particular first data structure of the one or more first data structures stored in the solid state memory device:
    determining, by the one or more processors, a level of similarity of the transaction represented by the particular first data structure to each of a plurality of predetermined categories;
    determining, by the one or more processors, a category of the transaction represented by the particular first data structure based on the determined level of similarity;
    generating, by the one or more processors, an input data structure that includes fields structuring data representing (i) at least a portion of the data representing the transaction that is structured by the first data structure and (ii) data describing the determined category;
    providing, by the one or more processors, the input data structure to a predictive algorithm that has been trained to determine (i) a value that represents a probability that a point-of-sale transaction initiated by an entity is fraudulent or (ii) a value that represents a probability of default on a loan by an entity;
    obtaining, by the one or more processors, output data generated by the predictive algorithm based on the predictive algorithm's processing of the input data structure, wherein the output data includes (i) a value that represents a probability that the particular point-of-sale transaction initiated by the entity and represented by the particular first data structure is fraudulent or (ii) a value that represents a probability that the entity would default on the particular loan that is requested by the entity and represented by the particular first data structure; and
    determining, by the one or more processors, (i) whether the particular point-of-sale transaction initiated by the entity and represented by the first data structure is fraudulent based on the obtained output data or (ii) whether the entity is likely to default on the particular loan that is requested by the entity and represented by the particular first data structure based on the obtained output data.

* * * * *